(12) United States Patent
Kim

(10) Patent No.: US 10,295,708 B2
(45) Date of Patent: May 21, 2019

(54) COVER WINDOW AND DISPLAY DEVICE HAVING THE SAME

(71) Applicant: SAMSUNG DISPLAY CO., LTD., Yongin, Gyeonggi-Do (KR)

(72) Inventor: Soo-Won Kim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1242 days.

(21) Appl. No.: 14/524,749

(22) Filed: Oct. 27, 2014

(65) Prior Publication Data

US 2015/0241606 A1    Aug. 27, 2015

(30) Foreign Application Priority Data

Feb. 26, 2014    (KR) .................. 10-2014-0022443

(51) Int. Cl.
| | |
|---|---|
| G02B 1/18 | (2015.01) |
| G02B 5/18 | (2006.01) |
| G02F 1/1333 | (2006.01) |
| G02F 1/1335 | (2006.01) |
| G06F 1/16 | (2006.01) |
| H04N 5/64 | (2006.01) |

(52) U.S. Cl.
CPC .................. *G02B 1/18* (2015.01); *G02B 5/18* (2013.01); *G02F 1/133308* (2013.01); *G02F 1/133502* (2013.01); *G06F 1/1656* (2013.01); G02F 2001/133388 (2013.01); H04N 5/64 (2013.01)

(58) Field of Classification Search
CPC . G02B 1/115; G02B 1/18; G02B 5/18; G02B 5/1814; G02B 5/1866; G02F 1/133308; G02F 1/133502; G02F 2001/133388

USPC .................. 359/567, 569, 576, 613
See application file for complete search history.

(56) References Cited

U.S. PATENT DOCUMENTS

| | | | | |
|---|---|---|---|---|
| 8,023,194 | B2* | 9/2011 | Kwon | G02F 1/133526 |
| | | | | 359/625 |
| 9,696,466 | B2* | 7/2017 | Liu | G02B 5/045 |
| 2003/0067460 | A1* | 4/2003 | Tomono | G02B 27/2214 |
| | | | | 345/419 |
| 2009/0242019 | A1* | 10/2009 | Ramamoorthy | H01L 31/0236 |
| | | | | 136/255 |
| 2010/0109988 | A1* | 5/2010 | Kao | G02F 1/133526 |
| | | | | 345/87 |
| 2011/0285934 | A1* | 11/2011 | Watanabe | G02F 1/133526 |
| | | | | 349/58 |
| 2012/0003426 | A1 | 1/2012 | Ying | |
| 2012/0013654 | A1* | 1/2012 | Yashiro | G02F 1/133504 |
| | | | | 345/690 |

(Continued)

FOREIGN PATENT DOCUMENTS

| | | |
|---|---|---|
| EP | 2 230 547 A1 | 9/2010 |
| GB | 2 455 791 A | 6/2009 |

(Continued)

*Primary Examiner* — Ricky D Shafer
(74) *Attorney, Agent, or Firm* — Lewis Roca Rothgerber Christie LLP

(57) ABSTRACT

A cover window covering a display panel of a display device comprises a base member covering a display area and a non-display area of the display panel, and an inorganic layer disposed on the base member. The inorganic layer has substantially uniform thickness on the display area, and has a diffraction grating structure on the non-display area.

9 Claims, 6 Drawing Sheets

(56) References Cited

U.S. PATENT DOCUMENTS

| | | | |
|---|---|---|---|
| 2012/0045614 A1 | 2/2012 | Chang et al. | |
| 2012/0110881 A1 | 5/2012 | Kang | |
| 2012/0120493 A1* | 5/2012 | Simmonds | G02B 6/0026 359/566 |
| 2012/0139964 A1* | 6/2012 | Han | G02F 1/133526 345/690 |
| 2013/0113964 A1* | 5/2013 | Sasaki | H01L 27/14629 348/276 |
| 2014/0293152 A1* | 10/2014 | Gao | G06F 3/044 349/12 |

FOREIGN PATENT DOCUMENTS

| | | |
|---|---|---|
| JP | 2008-116712 | 5/2008 |
| JP | 2011-150187 | 8/2011 |
| KR | 10-2011-0108847 A | 10/2011 |
| KR | 10-2013-0047294 | 5/2013 |
| KR | 10-2013-0062747 A | 6/2013 |
| KR | 10-2013-0064097 A | 6/2013 |
| KR | 10-2015-0009050 | 1/2015 |
| WO | WO 2012/176990 A1 | 12/2012 |

* cited by examiner

COVER WINDOW AND DISPLAY DEVICE HAVING THE SAME

CROSS REFERENCE TO RELATED APPLICATION

This application claims priority to and the benefit of Korean Patent Application No. 10-2014-0022443, filed on Feb. 26, 2014 in the Korean Intellectual Property Office (KIPO), the entire disclosure of which is hereby incorporated by reference.

BACKGROUND

1. Field

Example embodiments relate to cover windows formed on a surface of display devices and display devices having the same.

2. Description of Related Art

In general, a transparent cover window covers a display area and a non-display area (i.e., a bezel area) of a display panel to protect the display panel and inner circuits of a display device from external shocks and foreign material, such as dust and the like, and to transmit images generated from the display panel. The non-display area of the display device implements a color (e.g., a white color, a black color, etc) based on an ink layer or a print layer that is located between the display panel and the cover window.

Thus, a color of the ink layer (or the print layer) determines a color (design) of the non-display area. In other words, a pigment in the ink layer may determine a color of the overall the non-display area (the bezel area). However, the number of colors expressed by the ink layer is limited. Also, it is hard to represent a plurality of colors and patterns in the display device.

SUMMARY

Example embodiments provide a cover window including an inorganic layer having diffraction grating structure as well as a display device including the cover window.

According to example embodiments, a cover window may comprise a base member covering a display area and a non-display area of the display panel, and an inorganic layer disposed on the base member. The inorganic layer may have substantially uniform thickness on the display area, and may have a diffraction grating structure on the non-display area.

In example embodiments, the diffraction grating structure may include a plurality of grooves arranged in parallel in a first direction.

In example embodiments, the cover window may further comprise a coating layer disposed on the inorganic layer. The coating layer may have substantially uniform thickness such that the coating layer has a substantially flat shape on the display area and has a diffraction grating structure corresponding to the diffraction grating structure of the inorganic layer in the non-display area.

In example embodiments, the coating layer may include an anti-fingerprint coating layer.

In example embodiments, the anti-fingerprint layer may be formed with a fluorine-containing coating material.

In example embodiments, the inorganic layer may include silicon-oxide.

In example embodiments, the cover window may further comprise an anti-reflection (AR) layer disposed between the inorganic layer and the base member.

In example embodiments, the anti-reflection layer may include a plurality of layers having different refractive indexes.

In example embodiments, the anti-reflection layer may include a titanium oxide layer and a silicon oxide layer.

According to example embodiments, a display device may comprise a display panel including a display area and a non-display area, a cover window disposed on the display panel, and a resin layer disposed between the display panel and the cover window. The cover window may comprise a base member covering the display area and the non-display area of the display panel, and an inorganic layer disposed on the base member. The inorganic layer may have substantially uniform thickness on the display area, and may have a diffraction grating structure on the non-display area.

In example embodiments, the diffraction grating structure may include a plurality of grooves arranged in parallel in a first direction.

In example embodiments, the cover window may further comprise a coating layer disposed on the inorganic layer. The coating layer may have substantially uniform thickness such that the coating layer has a substantially flat shape on the display area and has a diffraction grating structure corresponding to the diffraction grating structure of the inorganic layer in the non-display area.

In example embodiments, the coating layer may include an anti-fingerprint coating layer.

In example embodiments, the anti-fingerprint layer may be formed with a fluorine-containing coating material.

In example embodiments, the inorganic layer may include silicon-oxide.

In example embodiments, the cover window may further comprise an anti-reflection (AR) layer disposed between the inorganic layer and the base member.

In example embodiments, the anti-reflection layer may include a plurality of layers having different refractive indexes.

In example embodiments, the anti-reflection layer may include a titanium oxide layer and a silicon oxide layer.

Therefore, the cover window and the display device having the same according to example embodiments may include the inorganic layer having the diffraction grating structure on the non-display area. The diffraction and reflection of the external light may occur from the diffraction grating structure, so that various colors may be seen at the non-display area (i.e. a bezel area) depending on viewing angle (e.g., an iridescent color). Thus, an aesthetic effect of the display device having the cover window may be improved.

In addition, the various colors of the non-display area and a design effect by the simple diffraction grating structure without additional process that forms a print layer or an ink layer, so that production cost may be reduced.

BRIEF DESCRIPTION OF THE DRAWINGS

Example embodiments can be understood in more detail from the following description taken in conjunction with the accompanying drawings, in which.

DETAILED DESCRIPTION

Exemplary embodiments will be described more fully hereinafter with reference to the accompanying drawings, in which various embodiments are shown.

Figure 1A:
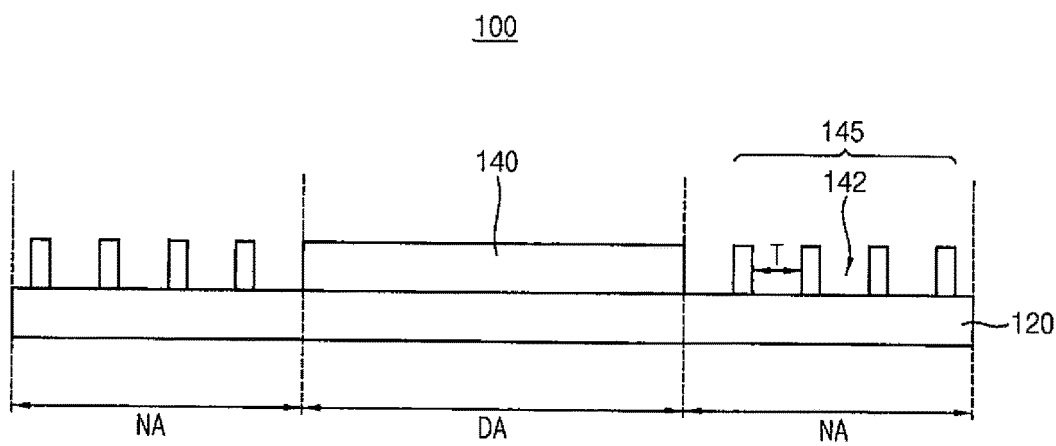
FIGS. 1A and 1B are cross-sectional views illustrating a cover window according to example embodiments.
Figure 1B:
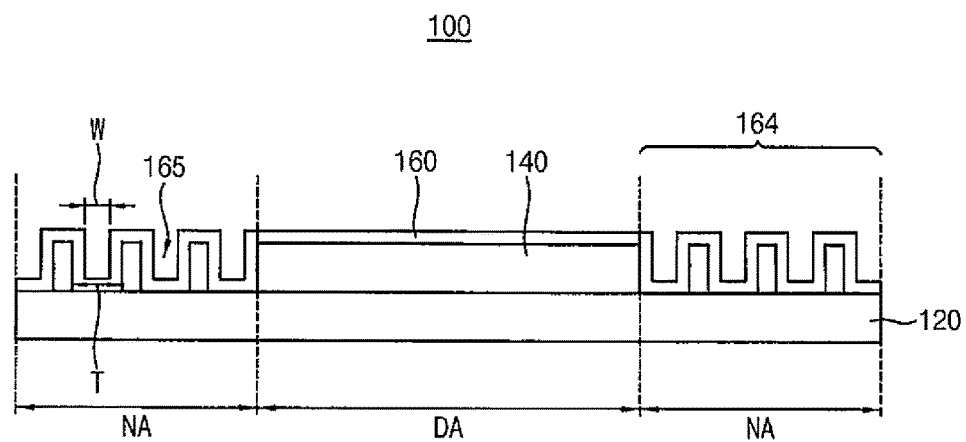

FIG. 1 is a cross-sectional view illustrating a cover window according to example embodiments.

Referring to FIG. 1, the cover window 100 may include a base member 120 and an inorganic layer 140. In an example embodiment, the cover window 100 may further include a coating layer disposed on the inorganic layer 140. The cover window 100 may cover a display panel that includes a display area DA and a non-display area NA of a display device (or an electronic device). In example embodiments, the non-display area NA may include a bezel area. Function-keys may be arranged at the non-display area NA.

The cover window 100 may protect inner components of the display device, while passively transferring images generated by a display panel.

The base member 120 may cover the display area DA and the non-display area NA of the display panel. The base member 120 may be attached to the display panel by optically clear adhesive (OCA) film or transparent adhesive resin.

In example embodiments, the base member 120 may include a tempered glass that is stronger than ordinary glass by about 3 times to about 5 times. In example embodiments, the base member 120 may be formed with a transparent plastic material. For example, the transparent plastic material may include polycarbonate (PC), polymethymethacrylate (PMMA), polyethylene-terephthalate (PET), polyimide (PI), and the like.

As illustrated in FIG. 1, the inorganic layer 140 may be disposed on the base member 120. In example embodiments, the inorganic layer 140 may have substantially uniform thickness on the display area DA and may have a diffraction grating structure 145 on the non-display area NA. In example embodiments, when a coating layer is included in the cover window 100, the inorganic layer 140 may improve adhesion between the base member 120 and the coating layer. The diffraction grating structure 145 may include a plurality of grooves 142 arranged in parallel in one direction on the non-display area NA. In example embodiments, the diffraction grating structure 145 may include the plurality of grooves 142 which have substantially uniform width (i.e., have a regular pattern). In example embodiments, relative widths of the grooves 142 may be different from each other. As illustrated in FIG. 1, in example embodiments, the diffraction grating structure 145 may have rectangular grooves 142 which have substantially uniform width. The grooves 142 may be formed on regions where the inorganic layer 140 is not formed on the base member 120. Thus, the coating layer may be directly contacted to the base member 120 at the grooves 142. In example embodiments, the diffraction grating structure 145 may have a concave shape. However, a shape of the diffraction grating structure is not limited thereto.

The diffraction may occur from the diffraction grating structure 145, so that colors may be seen at the non-display area NA depending on viewing angle. For example, the diffraction grating structure 145 may produce iridescent reflections. Further, a width of the grooves T may be determined by adjusting widths of a silt of a mask that is used to form the inorganic layer 140. Lights reflected at the diffraction grating structure 145 may have various colors depending on the width and/or the shape of the grooves. For example, the narrower the width of the grooves T, the more colorful the non-display area NA. In example embodiments, the diffraction grating structure 145 may include the plurality of grooves 142 arranged in parallel in one direction on the non-display area NA. For example, the direction may correspond to a long axis of the display device, or a short axis of the display device perpendicular to the long axis.

For example, the inorganic layer 140 may have a thickness of about 500□ to about 600□. In example embodiments, the inorganic layer 140 may include silicon-oxide (S102). The silicon-oxide may improve adhesion between the base member 120 and the coating layer. However, materials forming the inorganic layer 140 are not limited thereto. For example, the inorganic layer 140 may include silicon-nitride (SiNx), Silicon-oxynitride, etc.

In example embodiments, the cover window 100 may include an anti-reflection (AR) layer 130 (FIG. 5) between the inorganic layer 140 and the base member 120. The anti-reflection layer may include a plurality of layers having different refractive indexes. For example, the anti-reflection layer includes a titanium oxide layer and a silicon oxide layer. The titanium oxide layer and the silicon oxide layer may have different refractive indexes, so that they may act as the anti-reflection layer. Also, the titanium oxide layer and the silicon oxide layer may have different thicknesses, and may act as the anti-reflection layer. The anti-reflection layer may improve the transmittance of the display area DA of the display device, by preventing the external light from being reflected by the cover window 100 and the display panel.

In example embodiments, the inorganic layer 140 may be formed by a mask patterning process. For example, the diffraction grating structure 145 of the inorganic layer 140 may be formed by a slit mask or a halftone mask. In example embodiments, the inorganic layer 140 may be formed by a sputtering process, a vacuum evaporation process, a chemical vapor deposition (CVD) process, a plasma enhanced chemical vapor deposition (PECVD) process, a high density plasma-chemical vapor deposition (HDP-CVD) process, etc.

As described above, the cover window 100 of the display device in FIG. 1 may include the inorganic layer 140 having the diffraction grating structure 145 on the non-display area NA. The diffraction and reflection of the external light may occur from the diffraction grating structure 145, so that various colors may be seen at the non-display area NA depending on viewing angle (e.g., an iridescent color). Therefore, an aesthetic effect of the display device having the cover window 100 may be improved.

Furthermore, the various colors of the non-display area NA may be implemented by the simple diffraction grating structure 145 without a print layer or an ink layer, so that production cost may be reduced.

Figure 2:
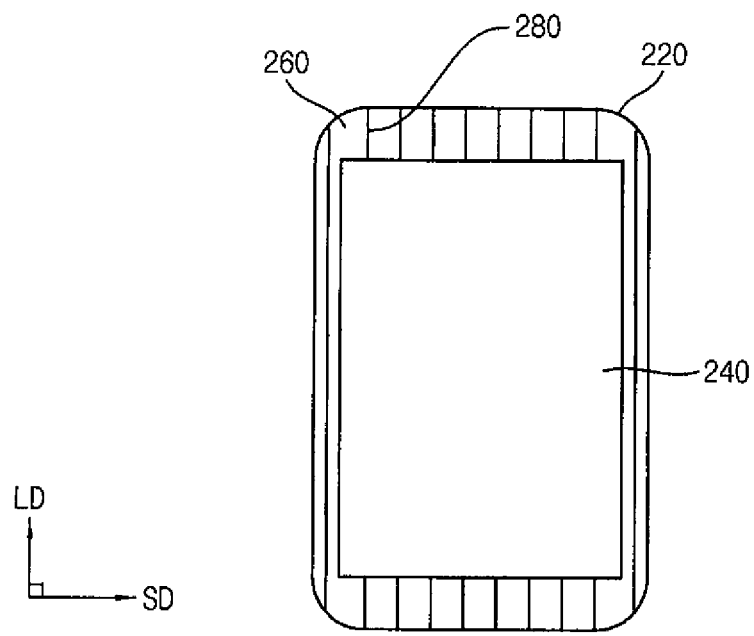
FIG. 2 is a plan view illustrating an example of the cover window of FIG. 1A.
Figure 3:
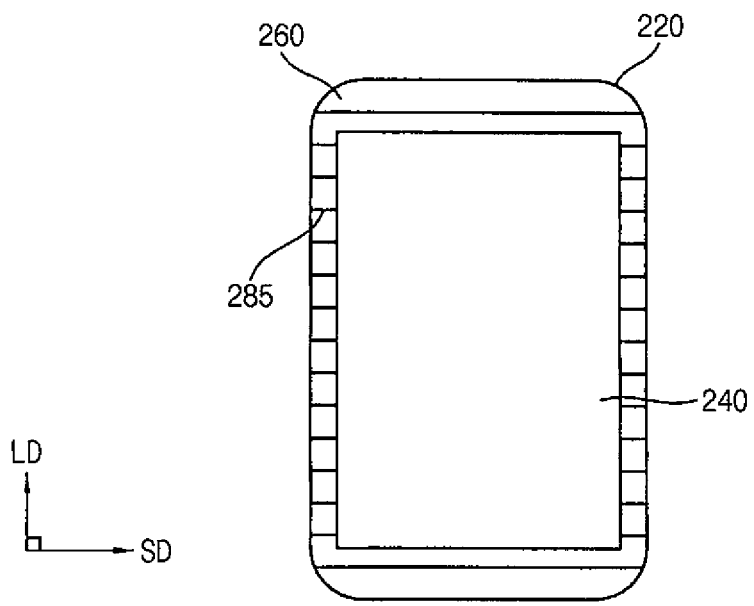
FIG. 3 is a plan view illustrating another example of the cover window of FIG. 1A.

FIG. 2 is a plan view illustrating an example of the cover window of FIG. 1, and FIG. 3 is a plan view illustrating another example of the cover window of FIG. 1.

Referring to FIGS. 2 and 3, the cover window 220 included in a display device may have a display area 240 and a non-display area 260. The cover window 220 may include a base member and an inorganic layer. The non-display area 260 of the cover window 220 may have a diffraction grating structure where a plurality of grooves 280 and 285 are included.

As illustrated in FIG. 2, the inorganic layer having substantially uniform thickness may be disposed on the display area 240 of the base member. The inorganic layer having the diffraction grating structure may be disposed on the non-display area 260 of the base member. In example embodiments, a coating layer may be disposed on the inorganic layer. The coating layer may have substantially uniform thickness such that the coating layer has a substantially flat shape on the display area 240 and has a diffraction grating structure corresponding to the diffraction grating structure of the inorganic layer in the non-display area 260.

In example embodiments, the diffraction grating structure of the inorganic layer may include a plurality of grooves 280 arranged in parallel in a first direction LD that is a direction of a long axis LD. The grooves 280 may have the substantially uniform width. In example embodiments, the diffraction grating structure of the inorganic layer may be formed by a mask patterning process.

In other words, the grooves 280 may be perpendicular to a direction of a short axis SD. The diffraction may occur from the diffraction grating structure, so that various colors may be seen at the non-display area 260 depending on viewing angle. For example, the non-display area 260 of the cover window 220 may have an iridescent surface along the first direction LD that is perpendicular to the short axis SD.

As illustrated in FIG. 3, the inorganic layer having substantially uniform thickness may be disposed on the display area 240 of the base member. The inorganic layer having the diffraction grating structure may be disposed on the non-display area 260 of the base member. In example embodiments, a coating layer may be disposed on the inorganic layer. The coating layer may have substantially uniform thickness such that the coating layer has a substantially flat shape on the display area 240 and has a diffraction grating structure corresponding to the diffraction grating structure of the inorganic layer in the non-display area 260.

In example embodiments, the diffraction grating structure of the inorganic layer may include a plurality of grooves 285 arranged in parallel in a second direction SD that is a direction of the short axis SD. The grooves 285 may have substantially uniform width. In example embodiments, the diffraction grating structure of the inorganic layer may be formed by a mask patterning process.

In other words, the grooves 285 may be perpendicular to the first direction LD. The diffraction may occur from the diffraction grating structure, so that various colors may be seen at the non-display area 260 depending on viewing angle. For example, the non-display area 260 of the cover window 220 may have iridescent surface along the second direction SD that is perpendicular to the long axis LD (the first direction).

However, directions and widths of the grooves 280 and 285 are not limited thereto. For example, the grooves may be arranged in corresponding to a diagonal axis of the cover window 220.

Figure 4A:
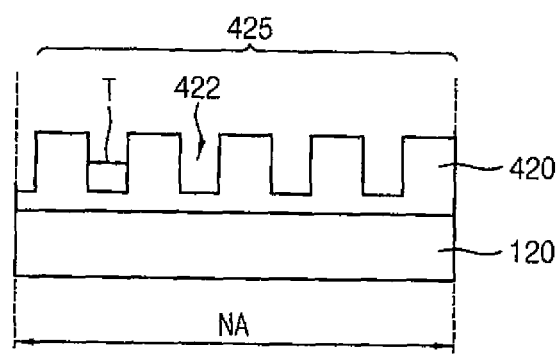
FIG. 4A is a cross-sectional view illustrating an example of a diffraction grating structure of the cover window of FIG. 1A.
Figure 4B:
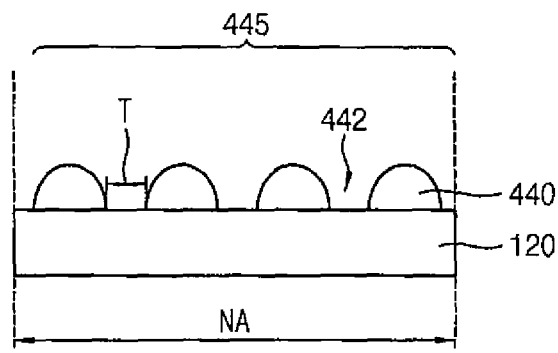
FIG. 4B is a cross-sectional view illustrating another example of a diffraction grating structure of the cover window of FIG. 1A.

FIG. 4A is a cross-sectional view illustrating an example of a diffraction grating structure of the cover window of FIG. 1, and FIG. 4B is a cross-sectional view illustrating another example of a diffraction grating structure of the cover window of FIG. 1.

Referring to FIGS. 4A and 4B, the cover window disposed on a non-display area NA of a display device may include a base member 120 and an inorganic layer 420 and 440 that is formed on the base member. The inorganic layer 420 and 440 may have a diffraction grating structure 425 and 445.

The base member 120 may include a tempered glass that is stronger than an ordinary glass from about 3 times to about 5 times. In example embodiments, the base member 120 may be formed with a transparent plastic material.

As illustrated in FIG. 4A, the inorganic layer 420 may have the diffraction grating structure 425. The diffraction grating structure 425 may include a plurality of grooves 422. For example, the diffraction grating structure 425 may be formed as a continuously concave-convex or sawtooth pattern. In example embodiments, the grooves 422 may have substantially the same width T and may extend in the same direction. In example embodiments, relative widths of the grooves 422 may be different from each other. The diffraction grating structure 425 may produce iridescent reflections. In example embodiments, the diffraction grating structure 425 may be formed by a slit mask or a halftone mask.

As illustrated in FIG. 4B, the inorganic layer 440 may have the diffraction grating structure 445. The diffraction grating structure 445 may include a plurality of grooves 442. For example, convex inorganic patterns may be formed on the base member 120. In example embodiments, the grooves 442 may have substantially the same width T and may extend in the same direction. In example embodiments, relative widths of the grooves may be different from each other. The diffraction grating structure 445 may produce iridescent reflections. In example embodiments, the diffraction grating structure 425 may be formed by a slit mask or a halftone mask.

However, shape of the inorganic layers 420 and 440 is not limited thereto. For example, the diffraction grating structure may have any shape having grooves that have substantially the same width and same direction.

Figure 5:
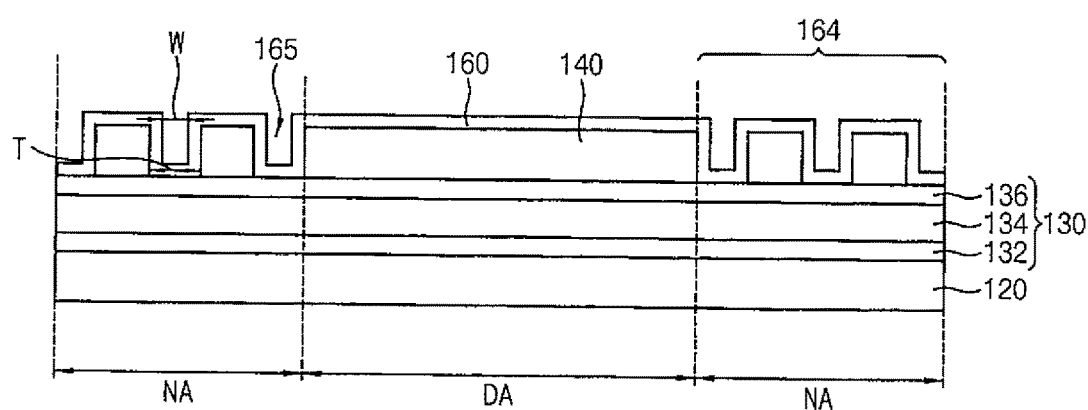
FIG. 5 is a cross-sectional view illustrating a cover window according to example embodiments.

FIG. 5 is a cross-sectional view illustrating a cover window according to example embodiments.

Referring to FIG. 5, the cover window 500 may comprise a base member 120 and an inorganic layer 140. In an example embodiment, the cover window 100 may further include a coating layer 160 disposed on the inorganic layer 140. In FIG. 5, like reference numerals are used to designate elements of the cover window the same as those in FIGS. 1A and 1B, and detailed description of these elements may be omitted. The cover window of FIG. 5 may be substantially the same as or similar to the cover window of FIG. 1 except for the coating layer 160.

The coating layer 160 may be disposed on the inorganic layer 140 and the exposed window member 120. The coating layer 160 may have substantially uniform thickness such that the coating layer 160 has a substantially flat shape on the display area DA and has a diffraction grating structure 164 corresponding to a diffraction grating structure of the inorganic layer 140 in the non-display area NA. The coating layer 160 may protect the base member 120 and/or a display panel from external shocks foreign material, such as dust and the like. For example, the coating layer 160 may have a thickness of about 100□ to about 250□. In example embodiments, the coating layer 160 may include an anti-fingerprint (AF) coating layer. The anti-fingerprint coating layer may prevent adhesion of fingerprints or components of the body such as lipids or proteins, hide fingerprints present on the cover window 100, and enable the fingerprints to be cleaned well.

The coating layer 160 may have substantially uniform thickness depending on a structure of the inorganic layer 140. Thus, the coating layer 160 may have the diffraction grating structure 164 or an embossing surface corresponding to the diffraction grating structure of the inorganic layer 140 in the non-display area NA. The diffraction grating structure 164 may include a plurality of concave regions 165. A width of the concave regions W may be adjusted corresponding to the width of the grooves T. The diffraction may occur from the concave regions 165, so that various colors may be seen at the non-display area (i.e. a bezel area) NA depending on viewing angle.

In example embodiments, the coating layer 160 may be formed with a fluorine-containing coating material or a hydrogen-fluorine-containing coating material. The fluorine-containing coating material may have a thermo hardening property. Also, fluorine may have waterproof and oil-proof properties, so that the fluorine-containing coating material may act as the anti-fingerprint coating layer. However, the coating layer 160 is not limited thereto. According to some embodiments, various coating layers may be disposed on the inorganic layer 140.

The coating layer 160 may be formed by vacuum deposition. However, a dry- or wet-process other than vacuum deposition may be used.

In example embodiments, the coating layer 160 may be formed on the inorganic layer 140 and the exposed window member 120 by the vacuum deposition. Heat or an electron beam is applied to allow a coating material (or coating solution) to evaporate in vacuum. As a result, the evaporated coating material may be uniformly deposited on the surface of the inorganic layer 140 and exposed regions of the window member 120. In example embodiments, the coating layer 160 may be formed by a wet process such as a dip coating, a spin coating, or a spray coating process. However, methods of forming the coating layer 160 are not limited to the examples given.

With continued reference to FIG. 5, the base member 120 may cover the display area DA and the non-display area NA of the display panel. The base member 120 may be attached to the display panel by optically clear adhesive (OCA) film or transparent adhesive resin. The base member 120 may include a glass or a transparent plastic.

The anti-reflection layer 130 may be disposed on the base member 120. In example embodiments, the anti-reflection layer 130 may include a plurality of layers 132, 134 and 136 having different refractive indexes. For example, the anti-reflection layer 130 may include a titanium oxide layer and a silicon oxide layer.

In example embodiments, the anti-reflection layer 130 may include a first titanium oxide layer 132 on the base member 120, a silicon oxide layer 134 on the first titanium oxide layer 132, and a second titanium oxide layer 136 on the silicon oxide layer 134. The first titanium oxide layer 132, the silicon oxide layer 134 and the second titanium oxide layer 136 may have different thicknesses and refractive indexes. Thus, the first titanium oxide layer 132, the silicon oxide layer 134 and the second titanium oxide layer 136 may act as the anti-reflection layer 130. The anti-reflection layer 130 may improve the transmittance of the display area DA of the display device, by preventing the external light from being reflected by the cover window 100 and the display panel. However, the plurality of layers 132, 134 and 136 included in the anti-reflection layer 130 are not limited thereto. For example, the anti-reflection layer 130 may have a layer having materials that different refractive indexes are mixed.

In example embodiments, the anti-reflection layer 130 may be formed by a sputtering process, a vacuum evaporation process, a CVD process, a PECVD process, a HDP-CVD process, etc.

The inorganic layer 140 may be disposed on the anti-reflection layer 130. The inorganic layer 140 may have substantially uniform thickness on the display area DA and may have a diffraction grating structure on the non-display area NA. In example embodiments, the diffraction grating structure may include a plurality of grooves arranged in parallel in one direction on the non-display area NA. A width of the grooves T (i.e., the grooves density) may be adjusted by a mask patterning.

In example embodiments, the inorganic layer 140 may be formed by a mask patterning process. For example, the diffraction grating structure of the inorganic layer 140 may be formed by a slit mask or a halftone mask. However, methods of forming the inorganic layer 140 are not limited thereto.

The coating layer 160 may be disposed on the inorganic layer 140 and the exposed window member 120. The coating layer 160 may have substantially uniform thickness such that the coating layer 160 has a substantially flat shape on the display area DA and has a diffraction grating structure corresponding to the diffraction grating structure of the inorganic layer 140 in the non-display area NA. The coating layer 160 may protect the anti-reflection layer 130, the base member 120 and/or a display panel from external shocks and pollutants. In example embodiments, the coating layer may include an anti-fingerprint (AF) coating layer. For example, the coating layer 160 may be formed with a fluorine-containing coating material or a hydrogen-fluorine-containing coating material. However, the coating layer 160 is not limited thereto.

The coating layer 160 may have substantially uniform thickness depending on a structure of the inorganic layer 140. Thus, the coating layer 160 may have the diffraction grating structure or an embossing surface corresponding to the diffraction grating structure of the inorganic layer 140 in the non-display area NA. The diffraction grating structure may include a plurality of concave regions 165. A width of the concave regions W may be adjusted corresponding to the width of the grooves T. Since the coating layer 160 is described above referred to FIG. 5, duplicate descriptions will not be repeated.

Figure 6:
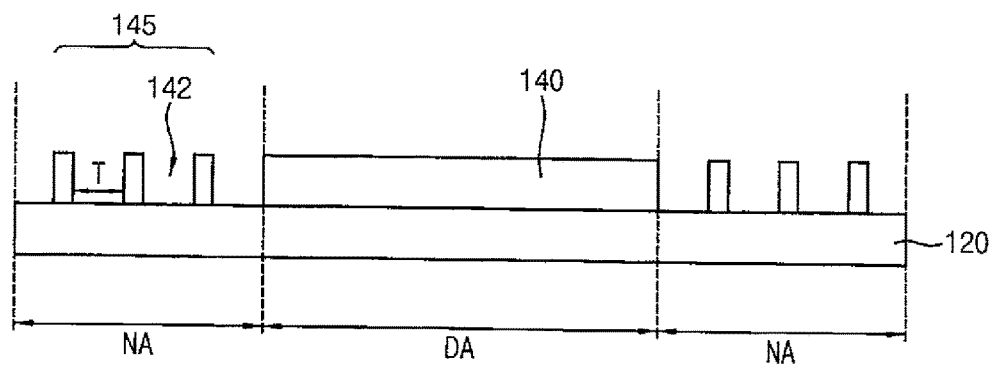
FIGS. 6 and 7 are cross-sectional views illustrating an example of method of manufacturing the cover window of FIG. 5.
Figure 7:
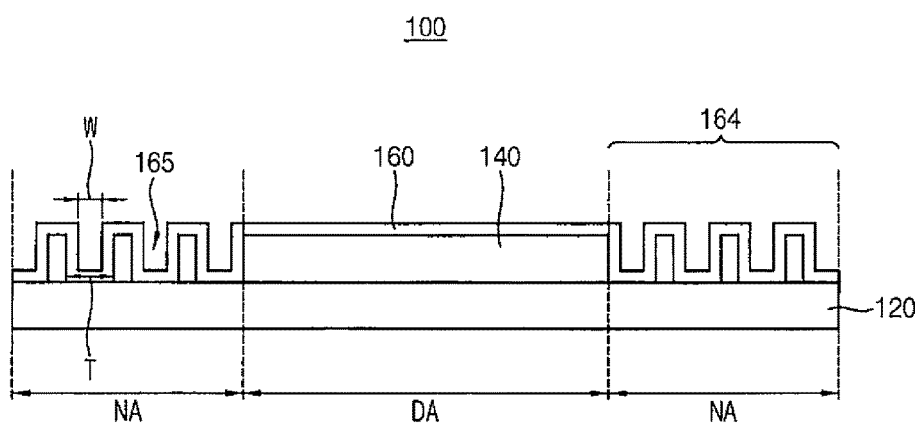

FIGS. 6 and 7 are cross-sectional views illustrating an example of method of manufacturing the cover window of FIG. 5.

Referring to FIGS. 6 and 7, the method of manufacturing the cover window of FIG. 6 may include forming an inorganic layer 140 having a diffraction grating structure 145 on a base member 120, and forming a coating layer 160 on the inorganic layer 140.

As illustrated in FIG. 6, the inorganic layer 140 may be formed on the base member 120. The inorganic layer 140 may have a substantially uniform thickness on a display area DA and may have a diffraction grating structure 145 on a non-display area NA. The inorganic layer 140 may be formed by a mask patterning process.

In example embodiments, the base member 120 may include a tempered glass that is stronger than ordinary glass by about 3 times to about 5 times. In example embodiments, the base member 120 may be formed with a transparent plastic material (or transparent resin).

The inorganic layer 140 may be formed on the base member 120. In example embodiments, the inorganic layer 140 may have a substantially uniform thickness on the display area DA and may have a diffraction grating structure 145 on the non-display area NA. When a coating layer 160 is disposed on the inorganic layer 140, the inorganic layer 140 may improve adhesion between the base member 120 and the coating layer. The diffraction grating structure 145 may include a plurality of grooves 142 arranged in parallel in one direction on the non-display area NA. For example, the grooves 442 may be formed at regions where the inorganic layer 440 is not formed on the base member 120. Thus, the coating layer may directly contact the base member 120 at the grooves 142.

In example embodiments, the diffraction grating structure 145 may include a plurality of grooves 142 arranged in parallel in one direction of the base member 120. A width of the grooves T may be adjusted by a mask patterning. In example embodiments, relative widths of the grooves may be different from each other.

The inorganic layer 140 may have a thickness of about 500□ to about 600□. In example embodiments, the inorganic layer 140 may include silicon-oxide (SiO2). However, materials forming the inorganic layer 140 are not limited thereto. For example, the inorganic layer 140 may be formed with silicon-nitride (SiNx), Silicon-oxynitride, etc.

In example embodiments, the inorganic layer 140 may be formed by a mask patterning process. For example, the diffraction grating structure 145 of the inorganic layer 140 may be formed by a slit mask or a halftone mask. In example embodiments, the anti-reflection layer 130 may be formed by a sputtering process, a vacuum evaporation process, a CVD process, a PECVD process, a HDP-CVD process, etc. The width of the grooves T may depend on process condition. In example embodiments, a width of concave regions 165 may depend on the width of the grooves T.

In example embodiments, an anti-reflection layer may be formed on the base member 120. For example, the anti-reflection layer may include a first titanium oxide layer on the base member 120, a silicon oxide layer on the first titanium oxide layer, and a second titanium oxide layer on the silicon oxide layer. The first titanium oxide layer 132, the silicon oxide layer 134 and the second titanium oxide layer 136 may have different thicknesses and refractive indexes. Thus, the first titanium oxide layer 132, the silicon oxide layer 134 and the second titanium oxide layer 136 may act as the anti-reflection layer 130. Since the anti-reflection layer is described above referred to FIG. 5, duplicate descriptions will not be repeated. The inorganic layer 140 may be formed on the anti-reflection layer.

As illustrated in FIG. 7, the coating layer 160 having a diffraction grating structure 164 that corresponds to the diffraction grating structure 145 of the inorganic layer 140 may be formed on the inorganic layer 140 and the exposed window member 120. The coating layer 160 may protect the base member 120 and/or a display panel from external shocks and foreign material, such as dust and the like.

In example embodiments, the coating layer 160 may include an anti-fingerprint coating layer having a fluorine-containing coating material or a hydrogen-fluorine-containing coating material. Fluorine may have waterproof and oil-proof properties, so that the fluorine-containing coating material may act as the anti-fingerprint coating layer. However, the coating layer 160 is not limited thereto.

The coating layer 160 may be formed on the inorganic layer 140 and the exposed window member 120. Thus, the coating layer 160 may have the diffraction grating structure 164 or an embossing surface corresponding to the diffraction grating structure of the inorganic layer 140 in the non-display area NA. The diffraction grating structure 164 may include a plurality of concave regions 165. A width of the concave regions W may be adjusted corresponding to the width of the grooves T. The diffraction may occur from the concave regions 165, so that various colors may be seen at the non-display area (i.e. a bezel area) NA depending on viewing angle.

The coating layer 160 may be formed by vacuum deposition. However, a dry- or wet-process other than vacuum deposition may be used.

In example embodiments, the coating layer 160 may be formed on the inorganic layer 140 and the exposed window member 120 by the vacuum deposition. Heat or an electron beam is applied to allow a coating material (or coating solution) to evaporate in vacuum. As a result, the evaporated coating material may be uniformly deposited on the surface of the inorganic layer 140 and exposed regions of the window member 120. In example embodiments, the coating layer 160 may be formed by the wet process such as a dip coating, a spin coating, or a spray coating process. Since these are examples, method of forming the coating layer 160 is not limited thereto.

Figure 8:
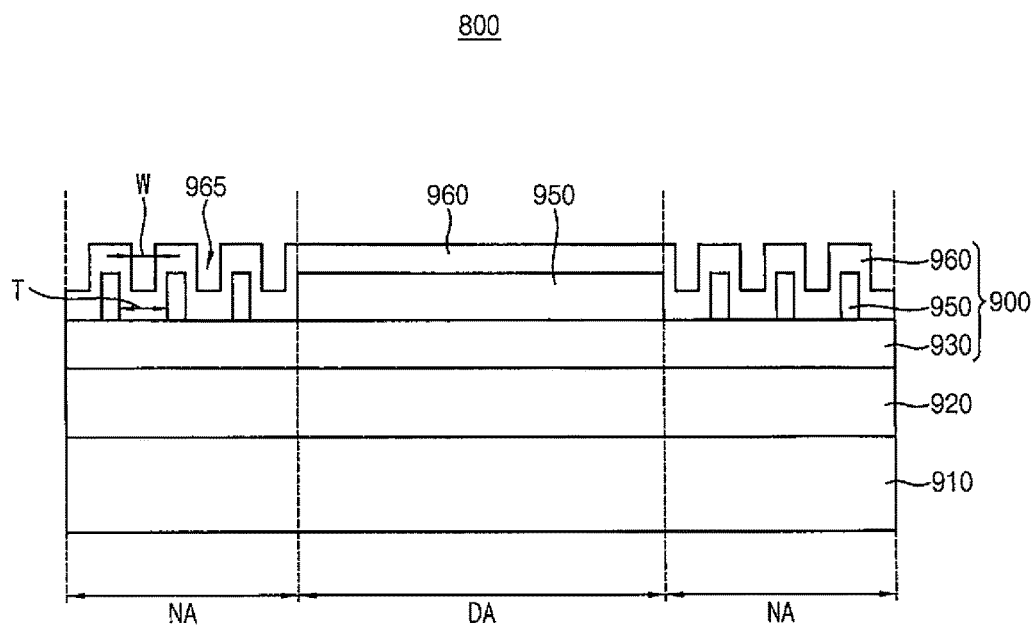
FIG. 8 is a cross-sectional view illustrating a display device according to an example embodiment.

FIG. 8 is a cross-sectional view illustrating a display device according to example embodiments.

Referring to FIG. 8, the display device 800 may include a display panel 910, a resin layer 920 and a cover window 900 where a base member 930, an inorganic layer 950 and a coating layer 960 are included. The display device may have a display area DA and a non-display area NA.

A plurality of pixels including pixel circuits may be included in the display area DA of the display panel 910. The display panel 910 may include components for implementing an image such as a scan driving unit, a data driving unit, a power unit, a timing control unit, etc. The components may be arranged in the non-display area NA of the display panel 910.

The display panel 910 may be an organic light emitting display panel, a liquid crystal display panel, a plasma display panel, an electrophoretic panel, an electrowetting display panel, etc. In example, embodiments, the display panel 910 may include a touch screen panel or a touch sensing module, etc.

The resin layer 920 may be disposed on the display panel 910. The resin layer 920 may attach the cover window 900 to the display panel 910. The resin layer 920 prevents air gaps from being formed between the display panel 910 and the cover window 900. Accordingly, the resin layer 920 may prevent foreign material, such as dust and the like, from being disposed between the display panel 910 and the cover window 900, so that image quality may be maintained. Further, the resin layer 920 may serve to attach the cover window 900 to the display panel 910, thereby improving the impact-resistance of the display device 800.

The cover window 900 may be disposed on the resin layer 920. The cover window 900 may include the base member 930 and the inorganic layer 950. In example embodiments, the cover window 900 may further include the coating layer 960 on the inorganic layer.

The base member 930 may cover a surface of the display panel 910. The base member 930 may include a glass or a transparent plastic.

The inorganic layer 950 may be disposed on the base member 930. In example embodiments, the inorganic layer 950 may have substantially uniform thickness on the display area DA and may have a diffraction grating structure on the non-display area NA. The diffraction grating structure may include a plurality of grooves arranged in parallel in one direction on the non-display area NA. In example embodiments, the plurality of grooves may have substantially uniform width (i.e., a regular pattern).

The inorganic layer 950 may include silicon-oxide ($SiO_2$). The inorganic layer 950 may be formed by a mask patterning process. For example, the diffraction grating structure of the inorganic layer 950 may be formed by a slit mask or a halftone mask.

The coating layer 960 may be disposed on the inorganic layer 950. The coating layer 960 may have substantially uniform thickness such that the coating layer 960 has a substantially flat shape on the display area DA and has a diffraction grating structure corresponding to the diffraction grating structure of the inorganic layer 950 in the non-display area NA. The coating layer 960 may protect the base member 930 and/or a display panel 910 from external shocks and pollutants. In example embodiments, the coating layer 160 may include an anti-fingerprint (AF) coating layer.

The diffraction grating structure of the coating layer 960 may include a plurality of concave regions 965. A width of the concave regions W may be adjusted corresponding to the width of the grooves T. The diffraction may occur from the concave regions 965, so that various colors may be seen at the non-display area NA depending on viewing angle. For example, the diffraction grating structure 145 may produce iridescent reflections. Lights reflected at the non-display area NA of the coating layer 960 may have various colors depending on the width and/or the shape of the grooves. For example, the narrower the width of the concave region W is, the more colorful the non-display area NA is.

Since the cover window 900 including the inorganic layer 950 and the coating layer 960 is described above referred to FIG. 1, duplicate descriptions will not be repeated.

As described above, the display device 800 in FIG. 8 may include the cover window 900 having the diffraction grating structure 145 on the non-display area NA. The diffraction and reflection of the external light may occur from the diffraction grating structure, so that colors may be seen at the non-display area (i.e. a bezel area) NA depending on viewing angle (e.g., an iridescent color). Therefore, an aesthetic effect of the display device 800 having the cover window 900 may be improved.

Furthermore, the various colors of the non-display area NA may be implemented by the simple diffraction grating structure 145 without a print layer or an ink layer, so that production cost may be reduced.

Figure 9:
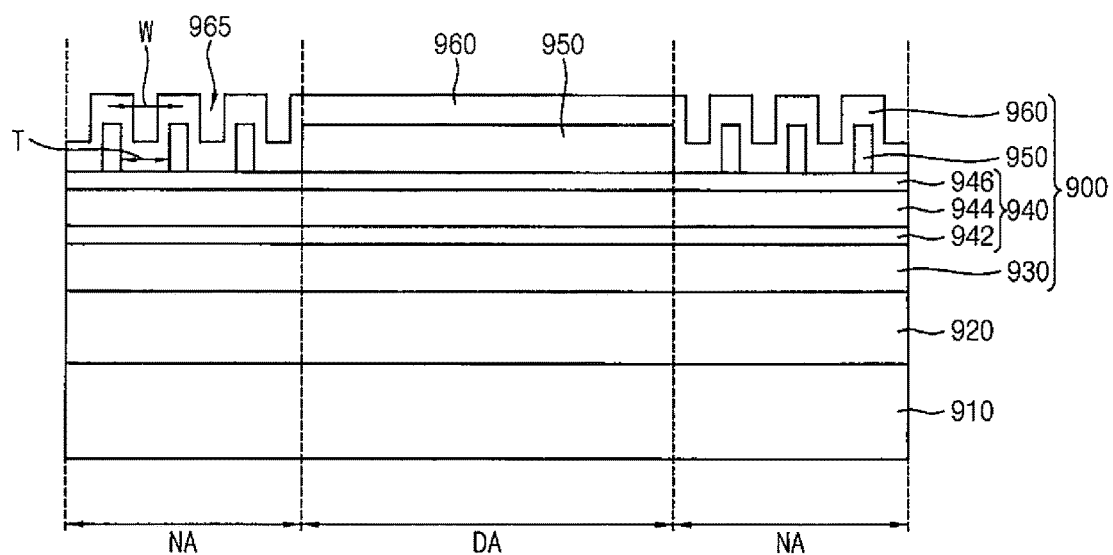
FIG. 9 is a cross-sectional view illustrating an example of the display device of FIG. 8.

FIG. 9 is a cross-sectional view illustrating an example of the display device of FIG. 8.

In FIG. 9, like reference numerals are used to designate elements of the cover window the same as those in FIG. 8, and detailed description of these elements may be omitted. Referring to FIG. 9, the display device 800 may include a display panel 910, a resin layer 920 and a cover window 900 where a base member 930, an anti-reflection layer 940, an inorganic layer 950 and a coating layer 960 are included. The display device may have a display area DA and a non-display area NA.

In example embodiments, the anti-reflection layer 940 may include a plurality of layers 942, 944 and 946 having different refractive indexes. For example, the anti-reflection layer 940 may include a titanium oxide layer and a silicon oxide layer. In other words, the anti-reflection layer 940 may include a first titanium oxide layer 942 on the base member 930, a silicon oxide layer 944 on the first titanium oxide layer 942, and a second titanium oxide layer 946 on the silicon oxide layer 944. The first titanium oxide layer 942, the silicon oxide layer 944 and the second titanium oxide layer 946 may have different thicknesses and refractive indexes. The anti-reflection layer 940 may improve the transmittance of the display area DA of the display device 800, by preventing the external light from being reflected by the cover window 900 and the display panel 910.

The non-display area NA of the cover window 900 may include continuously concave-convex pattern (i.e., the diffraction grating structure), so that colors may be seen at the non-display area (i.e. a bezel area) NA depending on viewing angle.

The present embodiments may be applied to any display device and any system including the display device. For example, the present embodiments may be applied to the display device, such as a Liquid Crystal Display (LCD) device, an Organic Light Emitting Display (OLED) device, Plasma Display Panel (PDP), etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A display device comprising:
a display panel including a display area and a non-display area;
a cover window located on the display panel; and
a resin layer located between the display panel and the cover window, wherein the cover window comprises:
a base member covering the display area and the non-display area of the display panel; and
an inorganic layer located on the base member, the inorganic layer having substantially uniform thickness on the display area, and having a diffraction grating structure on the non-display area.

2. The device of claim 1, wherein the diffraction grating structure includes a plurality of grooves arranged in parallel in a first direction.

3. The device of claim 1, wherein the cover window further comprises:
a coating layer located on the inorganic layer, and
wherein the coating layer has substantially uniform thickness such that the coating layer has a substantially flat shape on the display area and has a diffraction grating structure corresponding to the diffraction grating structure of the inorganic layer in the non-display area.

4. The device of claim 3, wherein the coating layer comprises an anti-fingerprint coating layer.

5. The device of claim 4, wherein the anti-fingerprint layer comprises a fluorine-containing coating material.

6. The device of claim 1, wherein the inorganic layer comprises silicon-oxide.

7. The device of claim 1, wherein the cover window further comprises:
   an anti-reflection layer located between the inorganic layer and the base member.

8. The device of claim 7, wherein the anti-reflection layer comprises a plurality of layers having different refractive indexes.

9. The device of claim 8, wherein the anti-reflection layer includes a titanium oxide layer and a silicon oxide layer.

* * * * *